United States Patent
Fox et al.

(10) Patent No.: US 9,519,794 B2
(45) Date of Patent: Dec. 13, 2016

(54) DESKTOP REDACTION AND MASKING

(71) Applicant: International Business Machines Corporation, Armonk, NY (US)

(72) Inventors: Joshua Fox, Haela (IL); Itai Gordon, Jerusalem (IL); Peter Hagelund, Lyngby (DK)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/520,394

(22) Filed: Oct. 22, 2014

(65) Prior Publication Data
US 2015/0161406 A1 Jun. 11, 2015

(30) Foreign Application Priority Data
Dec. 10, 2013 (GB) .................................. 1321768.2

(51) Int. Cl.
*G06F 21/00* (2013.01)
*G06F 21/62* (2013.01)

(52) U.S. Cl.
CPC .......... *G06F 21/62* (2013.01); *G06F 21/6245* (2013.01)

(58) Field of Classification Search
CPC ....... G06F 21/60; G06F 21/62; G06F 21/6245
See application file for complete search history.

(56) References Cited

U.S. PATENT DOCUMENTS

| 8,448,260 B1* | 5/2013 | Hansen .................. G06F 21/62 726/27 |
|---|---|---|
| 8,456,654 B2 | 6/2013 | Kelly et al. |
| 2006/0242558 A1 | 10/2006 | Racovolis et al. |
| 2008/0239365 A1 | 10/2008 | Salgado et al. |
| 2010/0205189 A1 | 8/2010 | Ebrahimi et al. |
| 2011/0239113 A1* | 9/2011 | Hung .................. G06F 19/3487 715/271 |
| 2011/0239306 A1 | 9/2011 | Avni et al. |
| 2012/0066691 A1 | 3/2012 | Branton |
| 2012/0131481 A1 | 5/2012 | Gupta et al. |
| 2013/0036478 A1 | 2/2013 | Davis et al. |

FOREIGN PATENT DOCUMENTS

| EP | 1906307 A1 | 2/2008 |
|---|---|---|
| EP | 2375353 A1 | 10/2011 |
| EP | 2393033 A2 | 12/2011 |
| WO | 0039713 A1 | 7/2000 |
| WO | 2006057806 A2 | 6/2006 |

OTHER PUBLICATIONS

"Filtered clipboard," Add-ons for Firefox, Version 1.4.8, dated Jun. 27, 2013, 2 pages. Accessed Aug. 13, 2014, https://addons.mozilla.org/en-us/firefox/addon/filtered-clipboard/.

(Continued)

*Primary Examiner* — Kendall Dolly
(74) *Attorney, Agent, or Firm* — Yee & Associates, P.C.; Ryan Lewis

(57) ABSTRACT

Redacting material in a user interface is provided. A monitoring agent waits for a change in input or output of user content. A change comparator identifies the change for sensitive material. A type comparator identifies the type of sensitive material. A redaction engine redacts the change according to the identified type of sensitive material.

15 Claims, 4 Drawing Sheets

(56) References Cited

OTHER PUBLICATIONS

"InfoSphere Guardium Data Security," IBM Software, undated, 2 pages. Accessed Aug. 13, 2014, http://www-01.ibm.com/software/data/guardium/.
"InfoSphere Optim Data Privacy," IBM Software, undated, 2 pages. Accessed Aug. 13, 2014, http://www-03.ibm.com/software/products/en/infosphere-optim-data-privacy.
"Method and system to enhance the accuracy of a data leakage prevention system across clipboard operations," IP.com Prior Art Database Technical Disclosure No. IPCOM000202883, Jan. 7, 2011, 3 pages.
"Redact-it Desktop," Tucows Downloads, May 15, 2013, 2 pages. Accessed Sep. 25, 2014, http://www.tucows.com/preview/1200972/Redact-It-Desktop.
"System clipboard enhancement to prevent sensitive data exposure," IP.com Prior Art Database Technical Disclosure No. IPCOM000216639D, Apr. 11, 2012, 2 pages.
UK International Search Report, dated May 21, 2014, regarding application No. GB1321768.2, 3 pages.

* cited by examiner

Clipboard Redaction Module 200

- Clipboard Monitor Agent 202
- Clipboard Buffer 204
- Sensitive Material Buffer 206
- Sensitive Material Type Register 208
- Redaction Type Methods 210
- 3rd Party Redaction Methods 212
- Change comparator 214
- Type comparator 216
- Clipboard Redaction Method 300

FIGURE 2

DESKTOP REDACTION AND MASKING

This Application is a counterpart of and claims the benefit of priority to United Kingdom Patent Office Application Serial No. 1321768.2, filed on Dec. 10, 2013, the contents of which are hereby incorporated by reference.

BACKGROUND

1. Field

This invention relates to a method and apparatus for desktop redaction and masking.

2. Description of the Related Art

Increasingly, users of information technology (IT) systems are required to handle sensitive information, such as personal identifiable information (PII), sensitive personal information (SPI), and information that is otherwise of a secret, sensitive, or proprietary nature.

Solutions are known in the enterprise environment for redacting, masking, and otherwise anonymizing or privatizing information either at rest, within a database, file system, or other static structure, or in flight, upon a communications wire, pipe, socket, or similar. In general, these solutions work within a predefined structure, associated with one or more enterprise applications, databases, and/or the customer's network and operating system infrastructure. For ad-hoc use, however, on a user's graphical workstation (for example on Windows operating system, Mac OS X operating system, or Linux operating system), there is no practical solution for day-to-day use by enterprise workers. Windows is a trademark of Microsoft Corporation in the US and other countries. Mac is a trademark of Apple Corporation in the US and/or other countries. Linux is a registered trademark of Linus Torvalds.

In the current art, each individual user must convert the information to specific formats or move the information into a specific application, then trigger redaction software. This is because existing solutions require the information to be in a particular document format or to be moved to a specific application for a redaction or masking solution to be able to ingest, analyze, and redact or mask the information. These limited solutions are restricted to specific client applications (part of enterprise grade redaction systems); or else they rely on application-specific plugins, some of which connect to redaction systems, and some of which offer a more limited functionality based only on patterns, such as regular expressions, that can filter contents.

When a user wants to move sensitive information available within one or more standard graphical application environments (such as a browser or desktop application), it is natural to use standard copy/paste and drag-and-drop operations, but in the current art this leaves the sensitive information unprotected and as-is.

There is a strong need for a convenient redaction solution which can be part of the day-to-day activity of an enterprise user. In this use case, the originating user has full access to the document so such a solution does not need to protect the data from the originating user.

Rather, it would be advantageous to increase compliance rates by making sure that as the user conducts his or her ordinary work, moving around information and sending it out as needed, the redaction or masking of PII and SPI is a completely natural and straightforward part of her ordinary workflow.

SUMMARY

In a first embodiment of the invention there is provided a computer processing system for redacting in a user interface comprising: a monitor agent for waiting for a change in input or output of user content: a change comparator for identifying the change for sensitive material; a type comparator for identifying the type of sensitive material; and a redaction engine for redacting the change according to the identified type of sensitive material.

In a second embodiment of the invention there is provided a method for redacting in a user interface comprising: waiting for a change in input or output of user content: identifying the change for sensitive material; identifying the type of sensitive material; and redacting the change according to the identified type of sensitive material.

Redacting in this publication encompasses different forms of obfuscating sensitive material including: removing, blanking, masking and encrypting some or all of the sensitive material.

The embodiments automatically and accurately hide sensitive information as part of a user interface (graphical or text based) including: cut, copy, paste operations; drag-and-drop operations; and clipboard operations.

The embodiments make a visual difference to any external process that relies on the operating system clipboard for content. The embodiments operate at a system level of a computer and below an overlying application level that uses a clipboard.

The change in input or output of user content is determined from an operating system clipboard status.

The clipboard content is removed or the clipboard is disabled while the identifying and redacting steps are performed.

Sensitive material types and corresponding redaction methods can be added or removed.

Sensitive material types and corresponding redaction methods can be added or removed by a third party. An application programming interface (API) to change the sensitive material types and corresponding redaction methods is provided to third parties on request.

In a third embodiment of the invention there is provided a computer program product for redacting content in a user interface, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth embodiment of the invention there is provided a computer program stored on a computer readable medium and loadable into the internal memory of a computer, comprising software code portions, when the computer program is run on a computer, for performing all the steps of the method claims.

In a fifth embodiment of the invention there is provided a data carrier aspect of the preferred embodiment that comprises functional computer data structures to, when loaded into a computer system and operated upon thereby, enable the computer system to perform all the steps of the method claims. A suitable data-carrier may be a solid-state memory, magnetic drive, or optical disk. Channels for the transmission of data may likewise comprise storage media of all descriptions as well as signal-carrying media, such as wired or wireless signal-carrying media.

BRIEF DESCRIPTION OF THE DRAWINGS

Preferred embodiments of the present invention will now be described, by way of example only, with reference to the following drawings in which:

FIG. 2 is a component diagram of the preferred embodiment;

DETAILED DESCRIPTION

Figure 1:
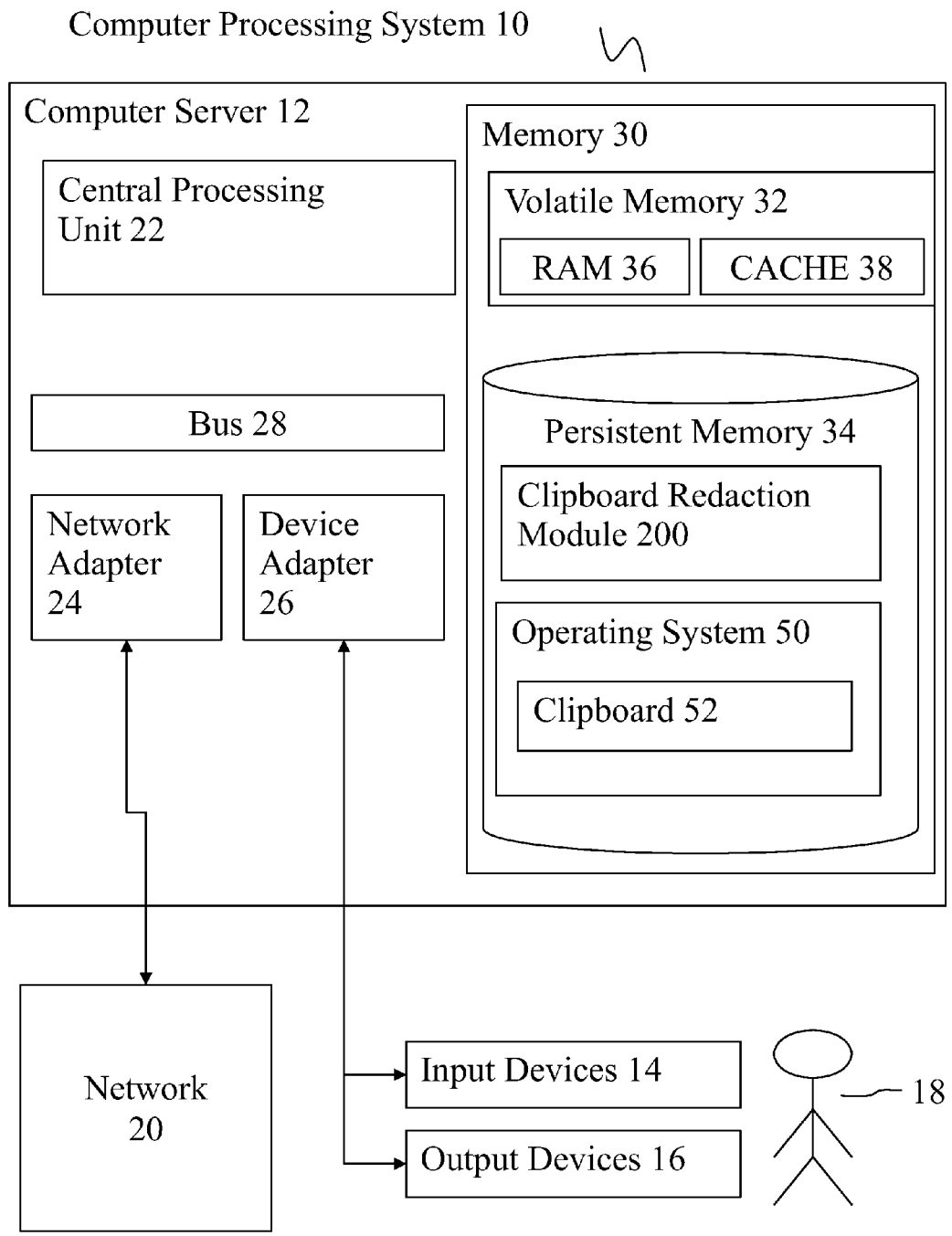
FIG. 1 is a deployment diagram of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to computer server 12. Computer processing system 10 is connected to network 20. Computer processing system 10 communicates with user 18 using input devices 14 and output devices 16. Input devices 14 include one or more of: a keyboard, a scanner, a mouse, trackball, or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in register (not shown); transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally, volatile memory is used because it is faster and will hold the data longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD), or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprise clipboard redaction module 200 and operating system 50. Operating system 50 includes clipboard 52. Clipboard 52 is an area of memory (persistent or volatile) that saves user selected matter from a particular context as a temporary holding place before that selected matter is placed somewhere other than the context from where it came. Further program modules that support the preferred embodiment but are not shown include firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that, although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Referring to FIG. 2, clipboard module 200 comprises the following components: a clipboard monitor agent 202; clip board buffer 204; sensitive material buffer 206; sensitive material type register 208; redaction type methods 210; third party redaction methods 212; change comparator 214; type comparator 216; and clipboard redaction method 300.

Clipboard monitor agent 202 is for monitoring operating system clipboard 52 for any changes.

Clipboard buffer 204 is for storing a clipboard change.

Sensitive material buffer 206 is for storing that part of clipboard contents that has been identified as sensitive.

Sensitive material type register 208 is for storing an identified type of sensitive material.

Redaction type methods 210 are redacting methods, each method for a type of redaction.

Third party redaction methods 212 are redacting methods that can be loaded from third party sources and for performing a type of redaction.

Change comparator 214 is for identifying what has changed in the clipboard content.

Type comparator 216 is for identifying the type of change that has happened.

Clipboard redaction method 300 is for performing redaction on clipboard changes according to the detailed description below.

Figure 3:
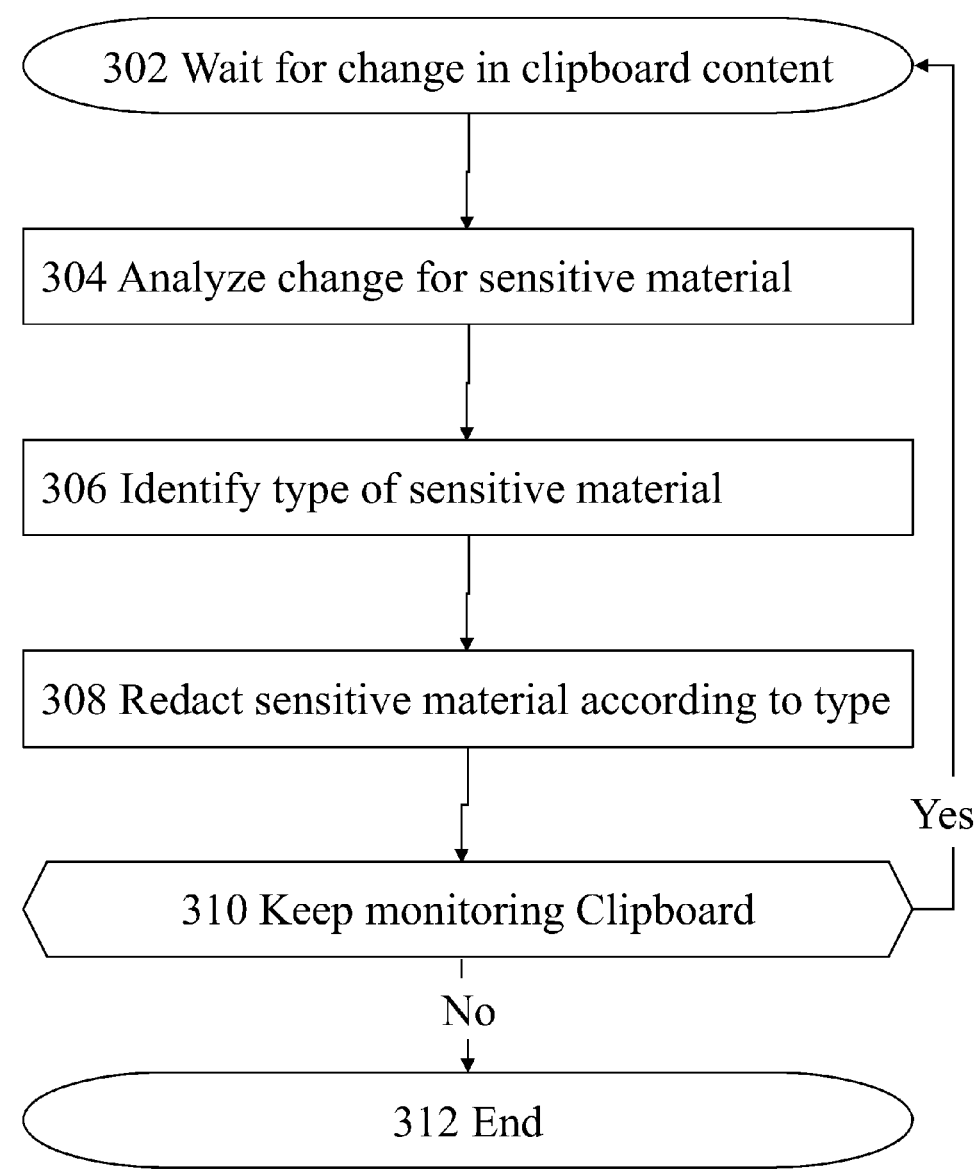
FIG. 3 is a flow diagram of a process of the preferred embodiment.

Referring to FIG. 3, clipboard redaction method 300 comprises logical process steps 302 to 312.

Step 302 is for waiting for a change in clipboard contents.
Step 304 is for analyzing the change for sensitive material.
Step 306 is for identifying a type of the sensitive material.
Step 308 is for applying a redacting method according to the type of sensitive method identified.

Step 310 is for determining whether to continue monitoring the clipboard and branching back to step 302 if so. Else step 312.

Step 312 is the end of clipboard redaction method 300.

In the preferred embodiment, the user copies content with sensitive information from an application, and wants to put it to another purpose, for example to send it to a colleague by email. In the current art, the user would have to create a document in the right format and move it to the relevant software for redaction and masking.

The preferred embodiment intercepts matter as it gets copied into the clipboard. When the user pastes the content to its email application, the preferred embodiment redacts the content, so that the content is free from sensitive information. To do this, a background agent process monitors the contents of the clipboard, mouse gestures and keyboard short-cuts (including screen shots), allowing information from any source and in virtually any format to be analyzed and redacted or masked.

The embodiments can support almost all applications in operating systems with graphical user interfaces (GUIs). Though each application offers a varying degree of customization and plug-in capabilities, almost all applications support basic clipboard, mouse gesture, and keyboard monitoring, allowing either automated or user-selected anonymization of the content copied, or dragged, from another application.

Windows, UNIX, Linux, and Mac OS X graphical environments contain public application programming interfaces (APIs) for monitoring the contents of the clipboard(s), as well as monitor mouse gestures and keyboard short cuts. UNIX is a registered trademark of The Open Group.

This allows an application, such as a background agent (or daemon), to actively participate in the general workflow initiated by the user. When detecting new or changed information placed in the clipboard, a paste operation, or a drag-and-drop operation entering the drop phase, the agent can either automatically or based on user gestures perform one or more of the following:

analyze the contents of the clipboard;
analyze the contents of the data being dropped;
redact or mask sensitive information such as (but not limited to): names; addresses; birthdates; national identifiers; credit card numbers; email addresses; and network addresses, such as host names, Internet Protocol addresses, and universal recourse locators (URLs);
replace the contents of the clipboard with the redacted or masked version;
replace the data being dropped with the redacted or masked version;
place the redacted or masked data as a format variation in the clipboard; and
place the redacted or masked data in a secondary clipboard (on platforms that support multiple clipboards).

For the redaction/masking phase, dedicated software can be used. These products analyze various document formats, including plaintext, rich text, forms, and graphics, and identify sensitive information. Once identified, the information is redacted or masked and an anonymized version of the document created.

On various graphical desktop environments, data transfer between applications (using the clipboard and drag-and-drop) follow similar data format standards, such as (but not limited to): plain text; formatted text; Rich Text Format (RFT); Hyper Text Markup Language (HTML); Tagged Image File Format (TIFF); Windows bitmaps; Windows Metafile (WMF); Portable Document Format (PDF); and PostScript (PS).

Once data arrives in the clipboard, or is about to be dropped, the embodiment can determine the format and perform analysis followed by redaction or masking with all data and information in memory, yielding acceptable performance for the various user interface gestures.

In addition to the user interface gesture monitoring and hooking described above, most operating systems support various additions to the graphical user interface, for example right-click menus, allowing contextual services to be made available to the user. This feature can be leveraged to provide the user with dedicated redaction and masking capabilities of text and graphical information.

The redaction policy of the invention can be configured by rules so the redaction or masking will take place only for specific sources or applications or content types.

In one use case, a doctor wants to discuss a patient's case with a colleague, but must protect the patient's PII, since this colleague is an external consulting physician. Policy specifies that people with this "role" may not see a patient's PII.

In the current art, the doctor would have to copy the information from the medical records system into a redaction application, then use the tools in this redaction application to redact the text, and then move the text into the email client. The difficulty of such a procedure would lead to many cases of non-compliance.

In the preferred embodiment, the doctor simply selects the text of the medical case record and drags it to his email agent. The embodiment intercepts the drag-and-drop, determines the "role" of the recipient (in this case an external consulting physician) and his permissions (in this case that the doctor may not see PII).

The embodiments take into account the source application (a medical records system) and the target application (the email client).

The source application is known to contain sensitive data, and the target application is known to transmit data out of the organization, and thus policies specify a particularly strict level of redaction.

The embodiments redact the PII and put the privatized text into the target application. The content that appears in the email agent will be redacted so that it contains no PII. It is ready to send.

Figure 4:
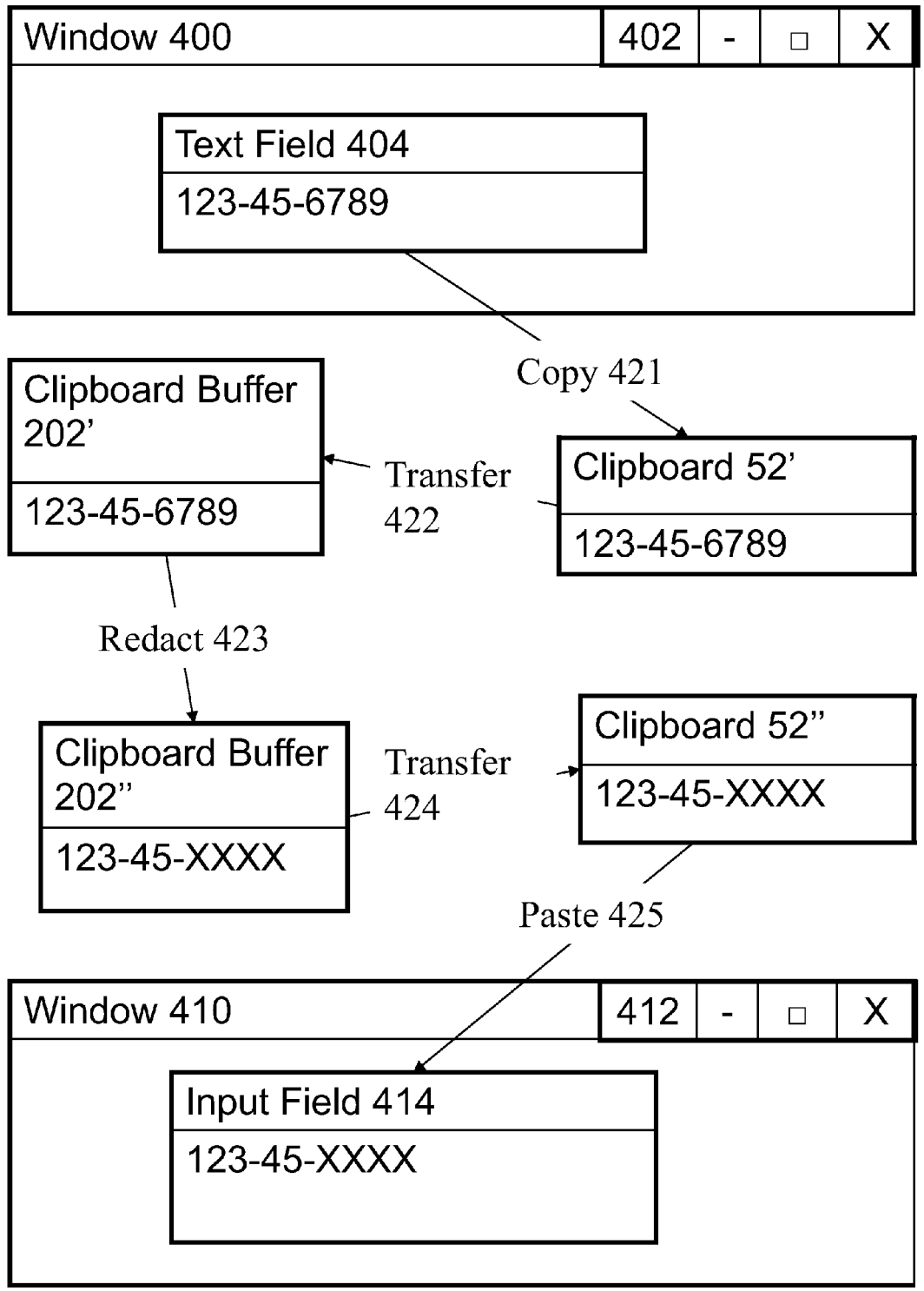
FIG. 4 is a diagram of windows of the preferred embodiment.

FIG. 4 shows two example windows 400 and 410 in a graphical user interface of the preferred embodiment. Window 400 comprises: window control 402; and text field 404. Window 410 comprises: window control 412 and input field 414.

Window controls 402 and 412 provide for minimizing; maximizing, and closing of the respective GUIs.

Text field 404 is a text box that provides output for the user interface. In this example the number "123-45-6789" is displayed. The user may copy the number to a clipboard.

Input field 414 is a text input box that receives input (it also provides output). Initially, the input field is blank or null, but after a user inputs or pastes contents into the box then the input will be displayed. In the example a redacted string "123-45-XXXX" is displayed after a paste operation by a user.

Also shown in FIG. 4 are representations of a clipboard 52' and 52" and clipboard buffer 202' and 202" after the example has been performed. This is not part of a user interface but represent internal parts of the embodiment.

Steps 421 to 425 are described in terms of the example.

At step 421 a user initiates copying of the text in text field 404. The text "123-45-6789" is transferred to the clipboard 52'.

At step 422, the clipboard contents "123-45-6789" are transferred to clipboard buffer 202' when a change is detected in the clipboard and the embodiment is initiated.

At step 423, the embodiment performs redaction on the content of clipboard buffer 202'. The type of change equates to a redaction method that crosses out the last four characters and clipboard buffer 202" now contains the string "123-45-XXXX".

At step 424 the redacted string is transferred back to clipboard 52".

At step 425 a user paste operation is allowed and the redacted string is pasted into input field 414 as "123-45-XXXX".

Further embodiments of the invention are now described. It will be clear to one of ordinary skill in the art that all or part of the logical process steps of the preferred embodiment may be alternatively embodied in a logic apparatus, or a plurality of logic apparatuses, comprising logic elements arranged to perform the logical process steps of the method and that such logic elements may comprise hardware components, firmware components, or a combination thereof.

It will be equally clear to one of skill in the art that all or part of the logic components of the preferred embodiment may be alternatively embodied in a logic apparatus comprising logic elements to perform the steps of the method, and that such logic elements may comprise components, such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

It will be clear to one skilled in the art that many improvements and modifications can be made to the foregoing exemplary embodiments without departing from the scope of the present invention.

What is claimed is:

1. A computer processing system for redacting in a user interface, the computer processing system comprising:
 a memory to store program instructions to execute a clipboard redaction module including:
  a monitoring agent, in a background process, for monitoring a clipboard for a change in input or output of user content, wherein the user content is intercepted when added to the clipboard;
  a change comparator, responsive to detecting the change, for analyzing the change for existence of sensitive material, wherein what has changed in the clipboard is identified;
  a type comparator, responsive to the existence of the sensitive material in the change, for identifying a type of the sensitive material in the change that has happened;

a clipboard buffer for storing a clipboard change;
a sensitive material buffer for storing a part of the user content identified as having sensitive material;
a sensitive material type register for storing the type of the sensitive material identified;
a set of redacting type methods comprising a particular redacting method for each corresponding type of the sensitive material identified; and
a redaction engine for redacting the change according to the type of the sensitive material using the set of redacting type methods to create an anonymous version of the user content by one of replacing contents of the clipboard with the anonymous version or placing the anonymous version in a secondary clipboard.

2. The computer processing system of claim 1, wherein the change in the input or the output of the user content is determined using a status of an operating system clipboard, and wherein the clipboard is the operating system clipboard, and wherein the monitoring further comprises events including mouse gestures, keyboard short-cuts and screen shots.

3. The computer processing system of claim 1, wherein one of clipboard content is removed or a clipboard is disabled while operations including the analyzing, the identifying and the redacting are performed.

4. The computer processing system of claim 1, wherein the types of the sensitive material and corresponding redaction methods are added or removed.

5. The computer processing system of claim 1, wherein types of the sensitive material and corresponding redaction methods are added or removed by a third party, and wherein the set of redacting type methods further comprising a set of third party redaction methods.

6. A method for redacting material in a user interface, the method comprising:
monitoring a clipboard, using a monitoring agent, in a background process, of a clipboard redaction module, for a change in input or output of user content, wherein the user content is intercepted when added to the clipboard;
responsive to detecting the change, analyzing the change for existence of sensitive material by a change comparator of the clipboard redaction module, wherein what has changed in the clipboard is identified;
responsive to the existence of the sensitive material in the change, identifying a type of the sensitive material in the change that has happened by a type comparator of the clipboard redaction module;
redacting the change according to the type of the sensitive material identified using a set of redacting type methods to create an anonymous version of the user content by one of replacing contents of the clipboard with the anonymous version or placing the anonymous version in a secondary clipboard; and
wherein the clipboard redaction module further comprises a clipboard buffer that stores a clipboard change, a sensitive material buffer that stores a part of the user content identified as having sensitive material, a sensitive material type register that stores the type of the sensitive material identified and the set of redacting type methods comprising a particular redacting method for each corresponding type of the sensitive material.

7. The method of claim 6, wherein the change in the input or the output of the user content is determined using a status of an operating system clipboard, and wherein the clipboard is the operating system clipboard, and wherein the monitoring further comprises events including mouse gestures, keyboard short-cuts and screen shots.

8. The method of claim 6, wherein one of clipboard content is removed or a clipboard is disabled while operations including the analyzing, the identifying and the redacting are performed.

9. The method of claim 6, wherein types of the sensitive material and corresponding redaction methods are added or removed.

10. The method of claim 6, wherein types of the sensitive material and corresponding redaction methods are added or removed by a third party, and wherein the set of redacting type methods further comprising a set of third party redaction methods.

11. A computer program product for redacting material in a user interface, the computer program product comprising a non-transitory computer-readable storage medium having computer-readable program code embodied therewith, which when executed by a computer processing system directs the computer processing system to:
monitor a clipboard using a monitoring agent, in a background process, of a clipboard redaction module, for a change in input or output of user content, wherein the user content is intercepted when added to the clipboard;
responsive to detecting the change, analyze the change for existence of sensitive material by a change comparator of the clipboard redaction module, wherein what has changed in the clipboard is identified;
responsive to the existence of the sensitive material, identify a type of the sensitive material in the change that has happened by a type comparator of the clipboard redaction module; and
redact the change according to the type of the sensitive material identified using a set of redacting methods to create an anonymous version of the user content by one of replacing contents of the clipboard with the anonymous version or placing the anonymous version in a secondary clipboard; and
wherein the clipboard redaction module further comprises a clipboard buffer that stores a clipboard change, a sensitive material buffer that stores a part of the user content identified as having sensitive material, a sensitive material type register that stores the type of the sensitive material identified and the set of redacting type methods comprising a particular redacting method for each corresponding type of the sensitive material.

12. The computer program product of claim 11, wherein the change in the input or the output of the user content is determined using a status of an operating system clipboard and wherein the clipboard is the operating system clipboard, and wherein the monitoring further comprises events including mouse gestures, keyboard short-cuts and screen shots.

13. The computer program product of claim 11, wherein one of clipboard content is removed or a clipboard is disabled while operations including the analyzing, the identifying and the redacting are performed.

14. The computer program product of claim 11, wherein types of the sensitive material and corresponding redaction methods are added or removed.

15. The computer program product of claim 11, wherein types of the sensitive material and corresponding redaction methods are added or removed by a third party, and wherein the set of redacting type methods further comprising a set of third party redaction methods.

* * * * *